UNITED STATES PATENT OFFICE.

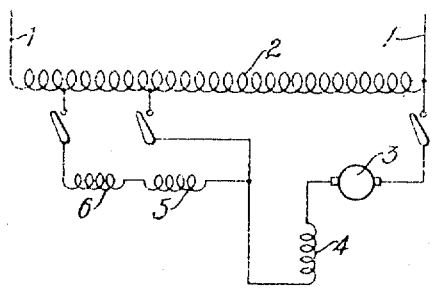
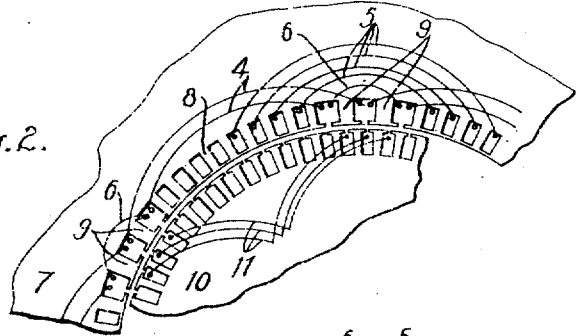
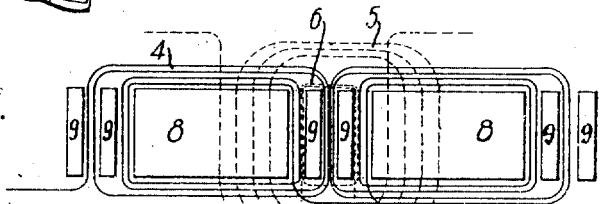
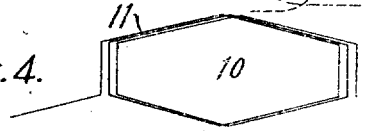
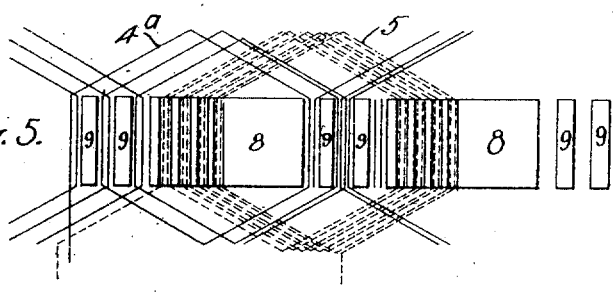

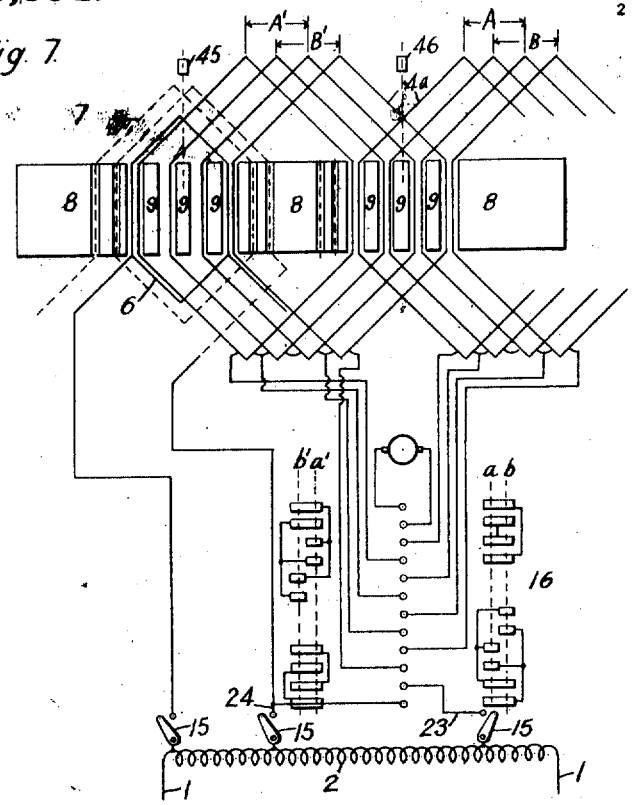

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,233,354.  Specification of Letters Patent.  Patented July 17, 1917.

Application filed March 30, 1914. Serial No. 828,109.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Dynamo-Electric Machines, of which the following is a specification.

My invention relates to dynamo-electric machines and systems of control therefor, and it has special reference to alternating current motors of the commutator type.

The object of my invention is to provide novel, simple and inexpensive means for improving commutation, under all conditions of load, in a machine of the above-indicated character.

It is desirable in alternating-current commutator motors to provide auxiliary inducing or compensating field windings that shall produce a field flux of such a phase that it has a component in phase with the armature current and a component in quadrature thereto, in order to fully compensate for the "sparking" voltage induced in the armature coils that are successively short-circuited by the brushes. The quadrature or shunt component may be obtained by connecting the inducing winding in shunt circuit relation to the motor, or across a portion of the operating transformer winding that is customarily provided. An in-phase or series component has heretofore been secured by disposing the main or exciting field coils to severally include one-half of the adjacent interpolar projections, in addition to the corresponding main polar projection, and by shifting the armature brushes so that the coil undergoing commutation was partly influenced by the main flux which was practically in phase with the armature current.

Commutating troubles were encountered, when employing a main field of the above-specified type, by reason of the fact that the series component referred to was produced and positively fixed by the strength of the main field current, thereby causing an overcompensation in many cases.

According to one form of my invention, I divide the main field winding into a plurality of parts, only one of which is disposed to include portions of the interpolar projections, as hereinbefore described, the remaining parts of the winding inclosing or influencing the corresponding main polar projections only. Thus, the proper number of turns of the main field winding may be wound around the interpolar projection, and the exact amount of series compensating flux is supplied to the commutating coils under all conditions of load.

It will be understood that, while the above-mentioned prior custom of shifting the position of the brushes a predetermined amount in one direction gave satisfactory results when the motors were rotating in a certain direction, it was impracticable to operate the motor in the other direction without again shifting the brushes a corresponding amount to the other side of the "neutral" commutating position. In order to obtain the desired result without removing the brushes from the neutral position, I provide a multi-part interpolar projection, and dispose the main field coils in such manner that, by changing certain circuit connections to the coils, some of the end coils remain inactive while the armature is rotating above a predetermined speed in one direction, and the corresponding coils in the other end of the group are rendered inoperative when the armature rotates in the other direction. In this way, the interpolar projections are properly influenced by the main field flux at all times, and the brushes are allowed to remain in the neutral position.

At low-power-factors in motors of the class in question, the large proportion of wattless current produces a slight series field effect in the interpolar projections, and fairly satisfactory commutation may thereby be secured, but, at higher power factors, such an effect is not normally produced, and, consequently, it is particularly toward producing proper commutating conditions at the higher power factored loads that the form of my invention just recited is directed.

Suitable means is provided for changing over the circuit connections at the proper time, whereby, in addition to the maintenance of good commutating conditions, the main field flux is varied by reason of the variation in the number of coils in circuit and, as a result, the speed of the motor is also changed, the variation referred to thus aiding the usual acceleration of the motor.

In the accompanying drawings, Figure 1 is a diagrammatic view of a system of control illustrating the circuit connections of a machine constructed in accordance with my invention; Fig. 2 is a diagrammatic view of a portion of a dynamo-electric machine embodying my invention; Fig. 3 is a developed view of the stator winding of Fig. 2; Fig. 4 is a fragmentary developed view of the rotor winding of Fig. 2; Fig. 5 is a winding diagram of a dynamo-electric machine, illustrating a modification of my invention; Fig. 6 is a detail view of a portion of the armature of the machine shown in Fig. 4, and illustrating the preferred construction of the armature core; Fig. 7 is a diagrammatic view of a system of control embodying a modification of my invention; and Figs. 8, 9, 10 and 11 are simplified diagrammatic views illustrating the development of the connections in the circuit of Fig. 7.

Referring to Fig. 1 of the drawings, the system here shown comprises a supply circuit 1, a suitable transformer winding 2 connected thereto, and a dynamo-electric machine, here shown as an alternating current motor of the commutator type having an armature 3, a main or exciting field winding 4, a compensating winding 5 and an interpolar winding 6. The motor may be connected to the transformer winding 2 in any suitable and well-known manner. Inasmuch as such connections do not form any material part of my present invention, no further description thereof will be given at this time.

Referring to Fig. 2, the portion of a dynamo-electric machine shown comprises a stator core 7 having a plurality of alternately-disposed main polar projections 8 and multi-part interpolar projections 9, and a coöperating rotor core 10 having a winding 11. The main polar projections 8 are provided with a plurality of longitudinal slots in which the turns of the compensating winding 5 are disposed, in accordance with familiar practice, and as indicated in Fig. 3. Each of the interpolar projections 9 preferably comprises two like teeth or parts and the interpolar winding 6 is wound around each set of two teeth. The main field winding 4 has a portion of its turns disposed around the several main polar projections 8 and has the remainder of its inclosing parts of the two adjacent interpolar projections and also corresponding main polar projection. The purpose of this disposition of the main field winding has already been pointed out.

The armature winding 11 is arranged to have its several coils span a distance corresponding to the pitch of the interpolar projections, as indicated in Fig. 2.

Reference may now be had to Fig. 5, in which a "form-wound" type of winding, having a similar purpose to that for which the main field winding 4 of Fig. 1 is employed, is illustrated. The field structure of Fig. 5 is similar to that of Fig. 3, main polar projections 8 and interpolar projections 9 being arranged to be excited by a main field winding $4^a$ and a compensating winding 5. The advantage of the type of winding shown in Fig. 5 is that the coils are all of substantially the same shape and size, and may be all "form-wound", thereby materially cheapening the construction of the machine and facilitating the assembly of the winding. As it would be difficult to place form-wound coils in closed slots, such as are shown in Fig. 2, I provide the main polar projections with partially closed transverse slots, as shown in Fig. 6, thus obtaining the mechanical advantage of form-wound coils and the magnetic advantage of said type of slot. It should be noted that the main field winding $4^a$ has some of its effective turns disposed around the main polar projections 8 and other effective turns disposed around the main projections and portions of the adjacent interpolar projections 9, thereby producing the same magnetizing effect as the winding shown in Fig. 3.

Reference may now be had to Fig. 7, in which the control system shown comprises a dynamo-electric machine having a field member 7 and an armature 3, a suitably energized transformer winding 2, a plurality of line switches 15 for connecting the dynamo-electric machine to the transformer winding, and a controller 16 for further controlling the operation of the machine.

The field member 7 comprises a plurality of alternately disposed main polar projections 8 and multi-part auxiliary commutating polar projections 9. A distributed compensating winding 5 is threaded through the main polar projections 8, in accordance with familiar practice, and an interpolar winding 6 is wound around the auxiliary polar projections 9. A main or exciting field winding $4^a$ comprises a plurality of sets of coils that respectively correspond to the various main polar projections. The winding $4^a$ has a portion of its effective turns surrounding the main projections 8, and other effective turns surrounding the main projections and portions of the adjacent auxiliary projections, similarly to the winding illustrated in Fig. 5. For purposes of convenience of description, each set of the main field coils is subdivided into groups designated by the letters A and A' and B and B', respectively. The groups A and A' severally include all but a predetermined number of turns at one end of the sets of coils; and the groups B and B', all but an equal number at the other end of the sets.

Assuming the switches 15 to be suitably manipulated, that the reverser is moved to its forward running position, and that the controller is moved to its initial forward running position $a$, the operation of the system shown may be described as follows: Energy is transmitted through a conductor to the controller 16, thence through one complete set of coils of the winding $4^a$, the armature 3, the remaining set of coils $4^a$ and returns to the winding 2 through a conductor 24, all as illustrated in Fig. 8. Movement of the controller 16 to the full-speed position "$b$" establishes the same circuit connections except that only the portions A and A' of the winding $4^a$ are energized, as shown in Fig. 9, thus producing the effect of a backward movement of the brushes indicated at 45 and 46.

In the same manner, the movement of the controller 16 to the first reverse position, indicated at "$a'$", connects in all portions of the winding $4^a$, with the armature connections reversed, (Fig. 10) and further movement to the position "$b'$" eliminates all but the portions B and B' of the winding $4^a$, (Fig. 11) producing the effect of a forward movement of the brushes 45 and 46.

The speed of the machine is thus increased in either direction, by reason of the weakening of the field flux and, in addition, the positions of the commutating zones of the machine are maintained substantially the same during the changes in machine speed and current.

It will be understood that, whereas, for the sake of simplicity, only a small number of main field winding coils is illustrated, my invention is readily applicable to larger numbers, and any suitable set of connections for performing the same functions as those set forth above, may be employed.

I do not wish to be restricted to the specific arrangement of circuits and the structural details herein set forth, but desire that only such limitations shall be imposed as are indicated in the appended claims.

I claim as my invention:

1. In a control system, the combination with a supply circuit, of a dynamo-electric machine having a plurality of sets of main and auxiliary polar projections, a subdivided operating winding having a portion of its effective turns surrounding said main polar projections and another portion surrounding the main projections and portions of the adjacent auxiliary projections, and means for reversing the direction of rotation of the machine which also exclude predetermined portions of said operating winding from circuit.

2. In a control system, the combination with a supply circuit, of an alternating current motor of the commutator type having a plurality of alternately-disposed main polar projections and multi-part auxiliary polar projections, a subdivided field winding comprising a plurality of sets of coils respectively corresponding to the various main polar projections and severally having portions of their effective turns inclosing said main polar projections and other portions of their effective turns inclosing the main projections and various parts of the adjacent auxiliary projections, and switching means for reversing the direction of rotation of the machine which also exclude from circuit predetermined numbers of the respective outer members of said sets of coils to maintain the commutating zones in substantially constant positions, as the motor current changes.

3. In a control system, the combination with a supply circuit, of an alternating current motor of the commutator type having an armature provided with a commutator cylinder and a plurality of brushes disposed thereon, and a field structure having a plurality of alternately-disposed main polar projections and multi-part auxiliary polar projections, a field winding comprising a plurality of sets of coils respectively corresponding to the various main polar projections and severally having portions of their effective turns inclosing said main polar projections and other portions of their effective turns inclosing the main projections and various parts of the adjacent auxiliary projections, a plurality of conductors for dividing the field winding into groups to omit predetermined numbers of turns from the respective ends of all of said sets of coils, under predetermined conditions, and switching means for reversing the direction of rotation of said motor and adapted to initially connect the entire field winding in circuit and, subsequently, dependent upon the direction of rotation, to connect in circuit the groups of coils that are adapted to produce the same commutating effect as backward setting of the brushes, whereby the armature commutating zones are maintained substantially in proper relation to the brush positions during variations in motor current.

4. The combination with a dynamo-electric machine provided with both main and cross field windings, said main field winding comprising a central group of coils and a terminal group of coils peripherally displaced with respect to said central group at each end thereof, each of said terminal groups overlapping its immediately adjacent cross field zone, of means for connecting at will all of said main field winding to a current source or for connecting said central group and either of said terminal groups to said current source.

In testimony whereof, I have hereunto subscribed my name this 25th day of Mar. 1914.

RUDOLF E. HELLMUND.

Witnesses:
J. V. DOBSON,
B. B. HINES.